United States Patent [19]

Kawakami

[11] Patent Number: 5,714,277
[45] Date of Patent: Feb. 3, 1998

[54] SECONDARY BATTERY

[75] Inventor: Soichiro Kawakami, Nara, Japan

[73] Assignee: Canon Kabushiki Kaisha, Tokyo, Japan

[21] Appl. No.: 218,638

[22] Filed: Mar. 28, 1994

[30] Foreign Application Priority Data

Mar. 30, 1993 [JP] Japan .................................. 5-071846
Mar. 30, 1993 [JP] Japan .................................. 5-071847

[51] Int. Cl.$^6$ .................................................. H01M 10/50
[52] U.S. Cl. ........................... 429/62; 429/129; 429/131; 429/137; 429/189; 429/198; 429/199
[58] Field of Search ........................... 429/129, 137, 429/131, 62, 189, 198, 199; 430/138

[56] References Cited

U.S. PATENT DOCUMENTS

| | | | |
|---|---|---|---|
| 3,653,972 | 4/1972 | Bolles | 136/90 |
| 3,953,230 | 4/1976 | Farrington et al. | 429/193 |
| 4,184,017 | 1/1980 | Kelsey et al. | 429/197 |
| 5,116,701 | 5/1992 | Kalisz | 429/130 |

FOREIGN PATENT DOCUMENTS

| | | | |
|---|---|---|---|
| 0486704 | 5/1992 | European Pat. Off. | |
| 2834485 | 2/1980 | Germany | |
| 63-86355 | 4/1988 | Japan | H01M 6/16 |
| 1-161671 | 6/1989 | Japan | H01M 6/16 |

OTHER PUBLICATIONS

Patent Abst. of Japan, vol. 4, No. 178 (C–034) Dec. 10, 1980.
Patent Abst. of Japan, vol. 14, No. 38 (E–878) Jan. 24, 1990.
Patent Abst. of Japan, vol. 14, No. 564 (E–1013) Dec. 14, 1990.
Patent Abst. of Japan, vol. 16, No. 73, (E–1169) Feb. 21, 1992.
Patent Abst. of Japan, vol. 16, No. 499 (E–1280) Oct. 15, 1992.
Patent Abst. of Japan, vol. 17, No. 535 (E–1439) Sep. 27, 1993.
Patent Abstracts of Japan, vol. 12, No. 320 (E–651), Aug. 30, 1988.
Patent Abstracts of Japan, vol. 13, No. 92 (E–722), Mar. 3, 1989.
Patent Abstracts of Japan, vol. 13, No. 433 (E–824), Sep. 27, 1989.

*Primary Examiner*—John S. Chu
*Attorney, Agent, or Firm*—Fitzpatrick, Cella, Harper & Scinto

[57] ABSTRACT

A purpose of the present invention is to provide a secondary battery of high safety and high energy density.

The battery of the present invention is a secondary battery microcapsules containing lithium at least formed of negative electrode active material, a separator, positive electrode active material, electrolytic solution (electrolyte), a collector and a battery case, characterized in that microcapsules are dispersed within the electrolytic solution or separator, said microcapsules discharging the chemical substance having hydroxyl group or chemical substance which is polymerization initiator, when the temperature within battery rises.

71 Claims, 5 Drawing Sheets

SECONDARY BATTERY

BACKGROUND OF THE INVENTION

1. Field of the Invention

The present invention relates to batteries with high safety, and more particularly to secondary batteries maintaining high safety even after repeated uses and having higher energy density.

2. Related Background Art

Recently, it is foreseen that the earth will be increasingly warmer due to the greenhouse effect with the increase of $CO_2$, which makes it difficult to construct new thermal power plants, and thus a so-called load leveling has been devised which permits the effective use of generated electric power by storing night power into the secondary batteries installed in general homes to level the load for more efficient utilization. Also, there is an increasing demand for developing small, lightweight secondary batteries having high energy density for use with the electric automobiles which exhaust no air pollutant, and the demand for developing secondary batteries of high performance for use with the power sources of portable equipment such as book-type personal computer, word processor, video camera, and portable telephone.

As the above-mentioned secondary battery of high performance, a rocking chair type lithium ion battery has been developed in which positive electrode active material has lithium ions introduced into the intercalation compound, and the negative electrode active material is made of carbon, and has been partially put to practical use. However, such lithium ion battery has a lower energy density than a lithium battery which uses metal lithium for the negative electrode active material.

The reason why no lithium accumulator of high capacity which uses lithium metal for the negative electrode has been practically used is because the occurrence of lithium dendrites (dendritic crystal) which are produced by repetitive charge and discharge and mainly cause short-circuits have not been successfully suppressed. When dendrites of lithium grow to cause a short-circuit between positive and negative electrodes, the energy of the battery will be consumed in a short time to produce heat. The heat will decompose the solvent an electrolyte to produce gases, which increases the inner pressure and eventually may result in some explosion. Also, there is a problem that heating may cause a fire by accident. Accordingly, the development of a safe accumulator not bringing about such accident is desired.

Also, in the battery involving chemical reaction and having the possibility of igniting, the development of a safe battery not causing such accident is desired.

SUMMARY OF THE INVENTION

It is an object of the present invention to resolve the above-mentioned conventional problems and provide a highly safe battery and a secondary battery having high energy density without decreasing battery performance.

As a result of careful research to solve the above conventional problems, the present inventors have found, as a first invention of this application, that there is provided a secondary battery with enhanced safety in such a way that the incombustibility of electrolyte is enhanced without decreasing the battery performance by mixing a flame retardant such as an inert liquid of fluorine compound into an electrolyte of a battery.

The present invention resides in a lithium secondary battery comprising a negative electrode having negative electrode active material, a positive electrode having positive electrode active material with a separator sandwiched between it and said negative electrode active material, and electrolyte solution between said negative electrode and said positive electrode, wherein said lithium secondary battery having phosphorus type flame retardant containing phosphorus element and/or halogen type flame retardant containing halogen element in said electrolyte solution, and said halogen type flame retardant is a perfluorocarbon of a fluorine compound inert liquid.

Further, the present invention resides in a lithium secondary battery wherein the surface of the negative electrode having said negative electrode active material opposed to the positive electrode is covered with a membrane capable of transmitting at least lithium ions, and the surface of the positive electrode composed of said positive electrode active material opposed to the negative electrode is covered with a membrane capable of transmitting at least lithium ions.

In addition, the present invention resides in a lithium secondary battery wherein said membrane is composed of flame retardant or incombustible material, a lithium secondary battery wherein said negative electrode active material is lithium or lithium alloy, a lithium secondary battery wherein the mixture ratio by weight of said flame retardant to electrolyte solution is from 1 to 20 wt %, and a lithium secondary battery wherein the boiling point of said perfluorocarbon is 50° C. or above.

Furthermore, as a result of careful researches to solve the above-mentioned conventional problems, the present inventors have found, as a second invention of this application, that by including microcapsules which emit the chemical substance reactable with lithium upon elevations in temperature into electrolytic solution (electrolyte) of the battery, dendrites of lithium which have grown to the short-circuit condition due to repeated charge and discharge are decomposed, thereby releasing the short-circuit condition to prevent ignition or bursting from occurring by the energy consumed in a short time, and the battery is reusable. Also, by including microcapsules emitting the chemical substance bringing about a curing reaction such as polymerization reaction or crosslinking reaction upon elevation in temperature into the electrolyte, the electrolyte can be solidified and the internal resistance of the battery increased when the temperature abnormally rises, thereby preventing ignition or bursting from occurring by the energy consumed in a short time.

The present invention is a secondary battery containing microcapsules comprising a negative electrode having negative electrode active material, a positive electrode having positive electrode active material with a separator sandwiched between it and said negative electrode active material, and electrolytic solution between said negative electrode and said positive electrode, characterized by having microcapsules containing the chemical substance in said separator and/or said electrolytic solution. Also, said secondary battery containing microcapsules is characterized in that the microcapsule containing secondary battery is a lithium secondary battery, that said chemical substance has at least a compound having hydroxyl group, that said chemical substance has at least polymerization initiator or cross-linking agent, that said microcapsule contains, in addition to polymerization initiator or cross-linking agent, one kind or more selected from monomer, oligomer, and polymer, that said chemical substance has at least acid, that said microcapsule has at least flame retardant, that the surface of the negative electrode composed of said negative electrode active material opposed to the positive electrode is covered with a membrane capable of transmitting at least lithium ions, that the surface of the positive electrode composed of said positive electrode active material opposed to the negative electrode is covered with a membrane capable of transmitting at least lithium ions, that said membrane is made of a fire retarding material or incombustible material, and that said negative electrode active material is lithium or lithium alloy.

Further, said secondary batter containing microcapsules is characterized in that the melting point of said microcapsule is from 70° to 150° C., that said microcapsule is from 1 to 500 microns in size, and that the mixture amount of said microcapsule is from 1 to 20 wt % of said electrolytic solution.

By including a chemical substance of monomer, oligomer, or polymer within said microcapsule, the internal resistance of battery is more easily increased when the temperature of the battery abnormally rises. Also, by including a flame retardant within said microcapsule, ignition can be suppressed more securely when the battery temperature abnormally rises.

DETAILED DESCRIPTION OF THE PREFERRED EMBODIMENTS

The present inventors have found, as a result of the examination for a lithium secondary battery formed by adding various kinds of materials to the electrolyte, that the aforementioned problems can be resolved if a phosphorus type flame retardant containing phosphorus element and/or halogen type flame retardant containing halogen element can meet the following properties:

1. Does not decompose lithium by the reaction with negative electrode having lithium.
2. Does not degrade remarkably the ion conductivity of an electrolyte.
3. Causing as little side reaction as possible except for battery reaction in charging and discharging.
4. Readily mixed into electrolyte (if mixing is unreliable, ignition may locally arise).
5. Capable of flame retardancy.

In a secondary battery wherein phosphorus type flame retardant containing phosphorus element is added to electrolyte, a phosphorus compound which is a flame retardant may be thermally decomposed when heating, so that a flame retarding membrane is formed on the lithium surface, and made flame retarding by the (dehydration) reaction with the organic solvent of the electrolyte. Also, in a lithium secondary battery wherein halogen type flame retardant containing halogen element is added to electrolyte, a halogen containing compound which is a flame retardant is thermally decomposed when subjected to heating, so that a flame retarding membrane is formed on the lithium surface, and made flame retarding by shutting down oxygen when exposed to external atmosphere. In addition, when using perfluorocarbon among the halogen compounds, the heat conductivity within the battery can be enhanced, and the local heating at the short-circuit of the battery can be suppressed.

Figure 4:
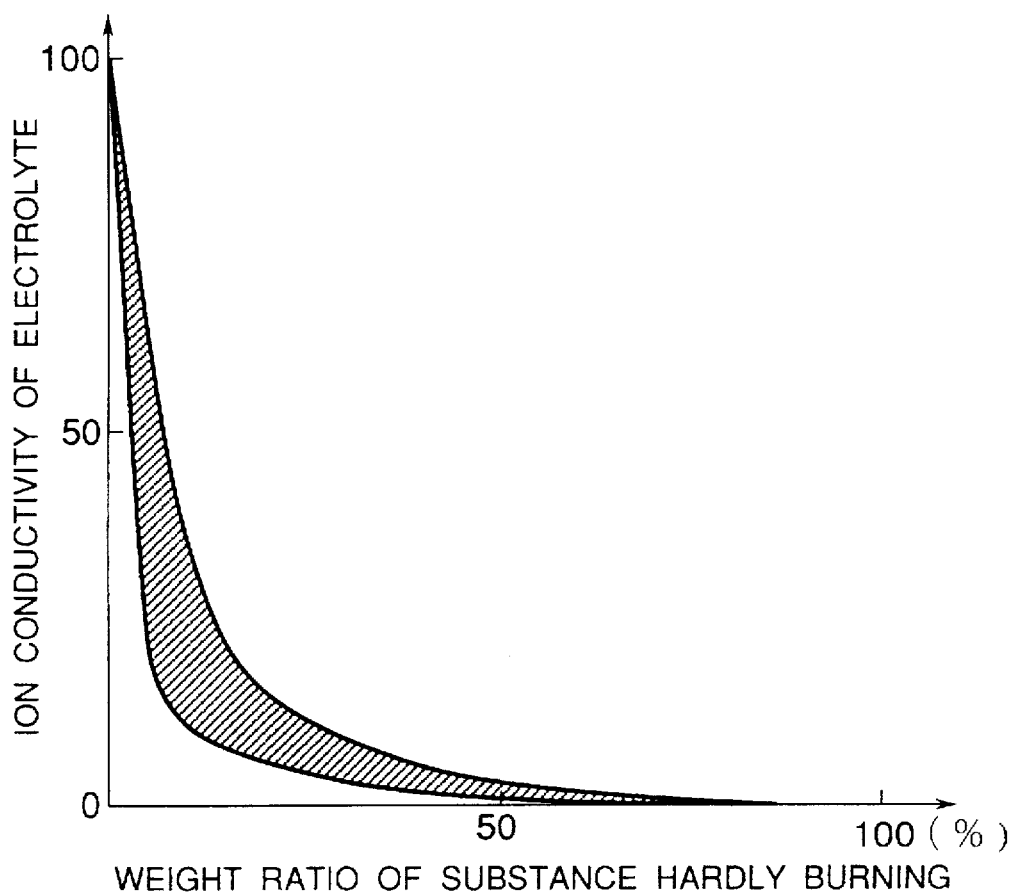
FIG. 4 is a graph representing the ion conductivity of electrolyte relative to the additive amount of flame retardant for use in the present invention.

The relation between the mixing ratio of phosphorus type flame retardant containing phosphorus element and halogen type flame retardant containing halogen element into the electrolyte and the ion conductivity is as represented in average in FIG. 4.

From FIG. 4, it can be seen that the range of flame retardant added to electrolyte which is capable of enhancing the flame retarding ability without decreasing the ion conductivity is preferably from 1 to 20 wt %, and more preferably from 2 to 10 wt %.

Flame Retardant

Examples of the flame retardant may include a phosphorus type flame retardant containing phosphorus element, a halogen type flame retardant containing halogen element such as iodine, bromine and chlorine, and a flame retardant containing both phosphorus element and halogen element. The halogen type flame retardant is particularly effective since perfluorocarbon which is a fluorine compound inert liquid has no influence on electrolytic reaction.

Examples of perfluorocarbon may include $C_5F_{12}$, $C_6F_{14}$, $C_7F_{16}$, $C_8F_{18}$, perfluorobutyltetrahydrofuran: $C_8F_{18}O$, perfluorotributylamine: $(C_4F_9)_3N$, perfluorotripropylamine: $(C_3F_7)_3N$, perfluorinatedether, perfluoromethyldecalin, and perfluorodecalin. When perfluorocarbon is used by mixing it into electrolytic solution (electrolyte), the boiling point is preferably 50° C. or greater.

Examples of the phosphorus type flame retardant may include red phosphorus, trimethyl phosphate, triethyl phosphate, tricresyl phosphate, tris(chloroethyl) phosphate, tri(dichloropropyl) phosphate, bis(2,3 dibromopropyl) 2,3 dichloropropyl phosphate, and tris(2,3 dichloropropyl) phosphate.

Other examples of the halogen type flame retardant may include hexabromobenzene, hexabromocyclododecane, and chlorotetrabromobutane.

To maintain the conductivity and the solubility of electrolyte, the mixture ratio of flame retardant into electrolytic solution is preferably from 1 to 20 wt %, and more preferably from 2 to 10 wt %.

(Constitution of battery according to the first invention of this application)

Figure 1:
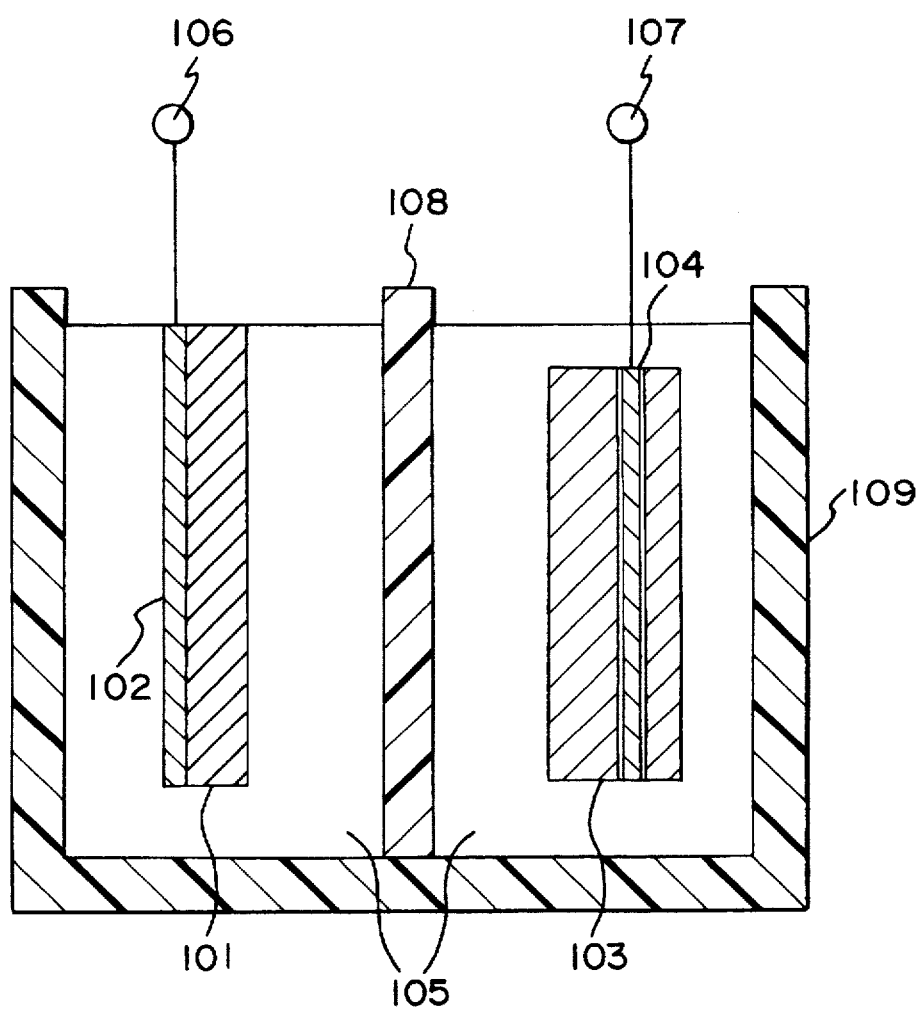
FIG. 1 is a typical view showing the basic construction of a lithium secondary battery according to the present invention.

The basic constitution of a secondary battery according to the present invention is comprised of a negative electrode (101) at least composed of negative electrode active material, a separator (108), a positive electrode (103) at least composed of positive electrode active material, electrolyte selected from phosphorus type flame retardant containing phosphorus element and halogen type flame retardant containing halogen element, and a collector. FIG. 1 shows a basic constitutional view of the secondary battery according to the present invention. In FIG. 1, 101 is a negative electrode composed of negative electrode active material, 102 is a negative electrode collector, 103 is a positive electrode composed of positive electrode active material, 104 is a positive electrode collector, 105 is an electrolytic solution (electrolyte) containing flame retardant, 106 is a negative electrode terminal, 107 is a positive electrode terminal, 108 is a separator, and 109 is a battery case.

In a lithium battery in which the negative electrode active material of negative electrode 101 is lithium or lithium alloy, lithium ions (not shown) in electrolyte 105 enter the intercalation of positive electrode active material of positive electrode 103, with discharge reaction, while dissolving into electrolyte 105 from the negative electrode active material. On the other hand, with charge reaction, lithium ions in electrolyte 105 pass through separator 106 to be deposited as lithium metal on the negative electrode active material (wherein dendrite is likely to grow), while lithium of the intercalation for the positive electrode active material 103 of positive electrode dissolves into the electrolyte 105, and if dendrites grow from the negative electrode, penetrates through the separator, ultimately resulting in the short-circuit between positive electrode and negative electrode, which causes the energy to be consumed in short time to bring about ignition in some instances. Because the electrolytic solution 105 contains flame retardant selected from phosphorus type flame retardant containing phosphorus element and halogen type flame retardant containing halogen element, organic solvent which is a solvent for the electrolytic solution can be rendered flame retarding even if it is flammable, so that ignition can be suppressed. Therefore, the selectivity of solvent material for the electrolytic solution can be improved.

Collector

Examples of collector material usable may include electrically conductive materials such as carbon, stainless steel, titanium, nickel, copper, platinum, and gold.

The shape of collector may be any shape of fiber, pore, or mesh.
(Positive electrode)

Positive electrode is formed by mixing positive electrode active material, conducting material powder and binding agent, and adding solvent, as required, and molding with collector.

Positive Electrode Active Material

Examples of the positive electrode active material for use, the intercalation of which lithium enters, may include metal oxides such as nickel oxide, cobalt oxide, titanium oxide, iron oxide, vanadium oxide, manganese oxide, molybdenum oxide, chromium oxide, and tungsten oxide, metal sulfides such as molybdenum sulfide, iron sulfide and titanium sulfide, hydroxides such as iron oxyhydroxide, and conducting polymers such as polyacetylene, polyaniline, polypyrrole, and polythiophene.

Herein, examples of the transition metal element for the transition metal oxides or transition metal sulfides may include elements partially having d shell or f shell, such as Sc, Y, lanthanoid, actinoid, Ti, Zr, Hf, V, Nb, Ta, Cr, Mo, W, Mn, Tc, Re, Fe, Ru, Os, Co, Rh, Ir, Ni, Pd, Pt, Cu, Ag, and Au. Mainly, the first transition series metals are used, such as Ti, V, Cr, Mn, Fe, Co, Ni, and Cu.

Conductive Substance Powder

The role of conductive substance powder is to assist in electron conduction and facilitate current collection when the active material has poor conductivity.

Examples of conductive substance powder may include a variety of carbon materials such as acetylene black, ketchen black, graphite powder, and metal materials such as nickel, titanium, copper, and stainless steel. The mixture weight ratio of conductive substance powder to active material is preferably 1 or less.

Binding Agent

The binding agent has a role of binding together active material powders to prevent cracks from occurring and falling off the collector in the charge and discharge cycle, when the moldability of active material is bad. Examples of the binding agent material may include fluororesin, polyethylene, polypropylene, and silicone resin, which are stable in the solvent. The above resins should be liquid or solution, or have a lower melting point, because the content of binding agent in the electrode can be lowered without decreasing the battery capacity. Specific examples of the resin liquid or dissolvable in the solvent may include, in addition to polyethylene and polypropylene, fluororesin and silicone resin containing ether bond. In particular, when fluororesin having ether bond is used, it can be dissolved in solvent for use at lower concentration, so that the content in the positive electrode can be decreased and the porosity can be raised.

Negative Electrode Active Material

Examples of the negative electrode active material may include lithium and lithium alloy. Examples of lithium alloy may include the alloys of magnesium, aluminum, potassium, sodium, calcium, zinc and lead with lithium.

Separator

The separator has a role of preventing the short-circuit between negative and positive electrodes. Also, it may have a role of holding electrolytic solution. The separator has fine pores through which ions involved in battery reaction are movable, and is required to be insoluble in the electrolytic solution and stable, and may be a nonwoven fabric made of glass, polypropylene, polyethylene, or fluororesin, or a material of microporous structure. Also, a metal oxide film having fine pores or a resin film having metal oxide compounded may be used. In particular, when a metal oxide film having multilayer structure is used, there is the effect of preventing any short-circuit because dendrite is unlikely to pass therethrough. When a fluororesin film which is a flame retardant or a glass or metal oxide film which is an incombustible material is used, the stability can be enhanced.

Electrolyte

The electrolyte is used in the state as it is, or in the state of solution dissolved in solvent, or in the stiffened state by adding a galatinizer such as polymer to the solution. Normally, electrolyte is used by retaining electrolytic solution having electrolyte dissolved in solvent in a porous separator.

The conductivity of electrolyte or electrolytic solution is preferred to be higher. The conductivity at least at 25° C. is desirably $1 \times 10^{-3}$ S/cm or more, and more preferably $5 \times 10^{-3}$ S/cm or more.

Examples of the electrolyte may include salts composed of lithium ion ($Li^+$) and Lewis acid ion ($BF_4^-$, $PF_6^-$, $AsF_6^-$, $ClO_4^-$), and mixture salts thereof. In addition to the above support electrolytes, salts of cation such as sodium ion, potassium ion, tetraalkylammonium ion with Lewis acid ion may be used. The above salts are desirably dewatered and deoxidized by heating under lower pressure.

Examples of the solvent for electrolyte may include acetonitrile, benzonitrile, propylene carbonate, ethylene carbonate, dimethylformamide, tetrahydrofuran, nitrobenzene, dichloroethane, diethoxyethane, chlorobenzene, γ-butyrolactone, dioxolane, sulfolane, nitromethane, dimethylsulfide, dimethylsulfoxide, dimethoxyethane, methyl formate, 3-methyl-2-oxazolidinone, 2-methyltetrahydrofuran, sulfur dioxide, phosphoryl chloride, thionyl chloride, sulfuryl chloride, and mixture solutions thereof.

The above solvents are dewatered by activated alumina, molecular sieve, phosphorusopentaoxide, or calcium chloride, or may be distilled in inert gas atmosphere under the coexistence of alkaline metal to effect the removal of impurities and dewatering, depending on the solvent.

To prevent any leakage of electrolytic solution, the gelatinization is desirable. The gelatinizer is desirably a polymer which swells by absorbing the solvent of electrolytic solution, examples of which may include polyethylene oxide, polyvinyl alcohol, and polyacrylamide.

(Negative electrode or positive electrode covering)

When the negative electrode active material is lithium, there may occur dendrite which causes a short-circuit at the time of charging, and to prevent the occurrence of such dendrite, negative electrode or positive electrode or the surface of negative electrode and positive electrode should be covered with a membrane through which lithium ions can pass to elongate the cycle life of battery.

Examples of covering material may include polymers of macrocyclic compound derivatives, polymers of aromatic hydrocarbon derivatives, fluororesin, silicone resin, titanium resin, polyolefin, or inorganic oxides, nitrides, carbides and halogenides. The covering of fluororesin, polyphosphazene, inorganic oxide, nitride, carbide and halogenide with flame retardant or incombustible material is effective to further enhance the safety of lithium secondary battery.

(Shape and structure of battery)

The practical shape of the battery may be flat, cylindrical, rectangular or sheet-like. The spiral cylindrical type can have a larger electrode area by winding the electrode with a separator sandwiched between positive and negative electrodes to allow a larger electric current to flow in charging and discharging. Also, the rectangular type allows the effective use of storage space for the equipment where battery is stored. The structure may be of the single layer or multi-layer type.

Figure 2:
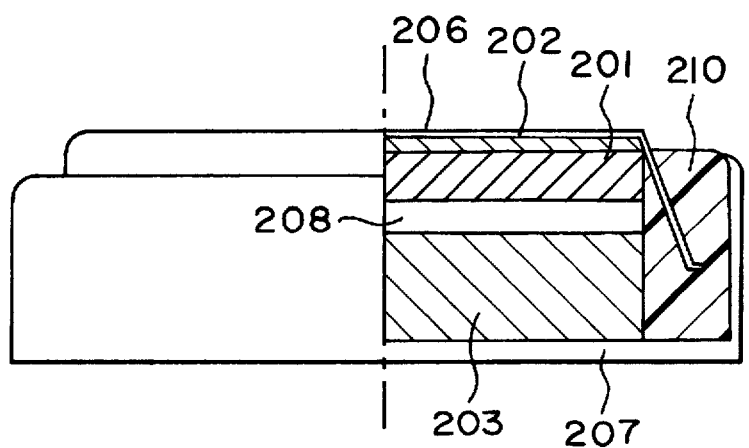
FIG. 2 is a schematic cross-sectional view of a flat lithium secondary battery according to one embodiment of the present invention.
Figure 3:
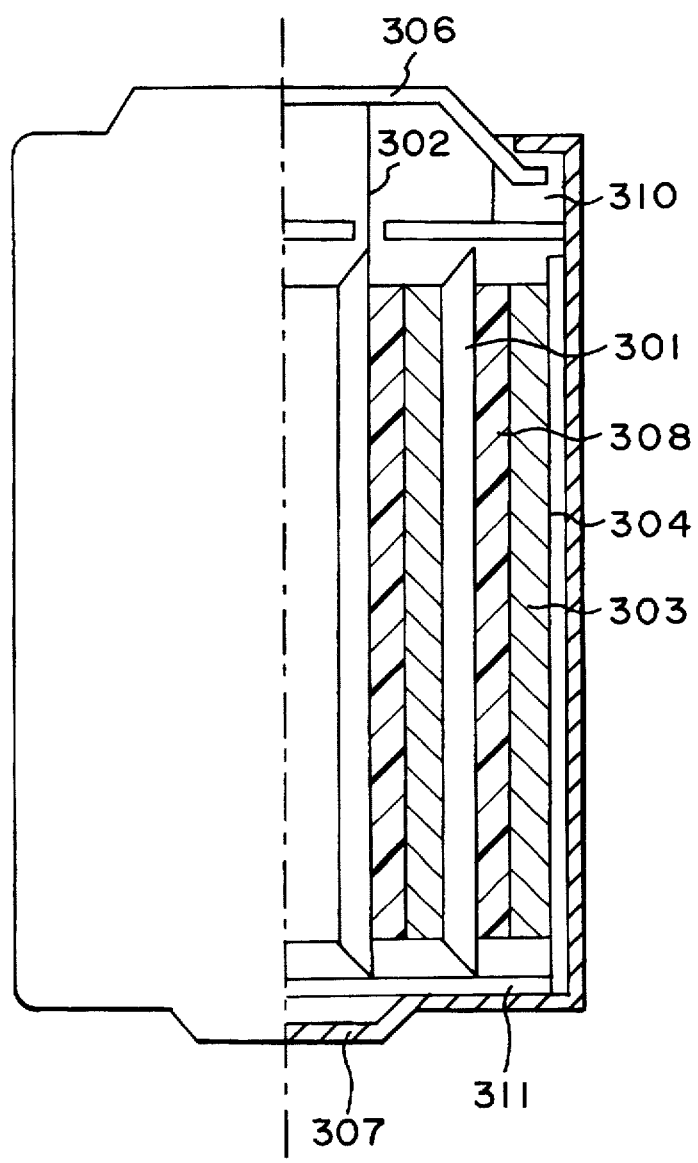
FIG. 3 is a schematic cross-sectional view of a cylindrical lithium secondary battery according to another embodiment of the present invention.

FIGS. 2 and 3 illustrate schematic cross-sectional views of a single layer type flat battery and a spiral structure cylindrical battery. In FIGS. 2 and 3, 201 and 301 are negative electrodes made of negative electrode active material, 202 and 302 are negative electrode collectors, 203 and 303 are positive electrodes made of positive electrode active material, 304 is a positive electrode collector, 206 and 306 are negative electrode terminals (negative electrode caps), 207 and 307 are outer packaging cans (positive electrode cans) which are also used as the battery case, 208 and 308 are separators holding the electrolytic solution containing flame retardant or holding microcapsules and the electrolytic solution, 210 and 310 are insulating packings, and 311 is an insulating plate.

An example of assembling the battery of FIGS. 2 and 3 involves incorporating a positive electrode 203, 303 and a negative electrode 201, 301, with a separator 208, 308 sandwiched therebetween, into a positive electrode can 207, 307, injecting the electrolytic solution containing flame retardant or the electrolytic solution with microcapsules containing chemical substance dispersed, placing a negative cap 206, 306 and an insulating packing 210, 310, and caulking to fabricate the battery.

It should be noted that the preparation of lithium battery material and the assembling of battery are desirably made in the dry air with water contents removed sufficiently, or in the dry inert gas.

Battery Case (outer packaging can)

The battery case may be a metallic outer packaging case which is also used as the output terminal, or a plastic resin case.

Examples of the material for positive electrode can 207, 307 or negative cap 206, 306 of actual battery may include stainless steel, in particular, titanium clad, stainless, copper clad, stainless, and nickel plated steel plate.

In FIGS. 2 and 3, the positive electrode can 207, 307 is also used as the battery case, examples of the material of which may include, in addition to stainless steel, metals such as aluminum, plastics such as polypropylene, or composites of metal or glass fiber with plastics.

Insulating Packing

Examples of the material for insulating packing 210, 310 may include fluororesin, polyamide resin, polysulphone resin, and a variety of rubbers.

Sealing

The sealing may be made by adhesive, welding, soldering, glass sealing, in addition to caulking using a gasket such as insulating packing.

Insulating Plate

The material of insulating plate usable for the insulation or isolation within the battery may be any of a variety of organic resins, or ceramics.

Safety Valve

The safety measure against increased inner pressure of battery, not shown in FIGS. 2 and 3, involves providing a safety valve using rubber, spring, or metallic hole.

(Constitution of battery according to the second invention of his application)

Figure 5:
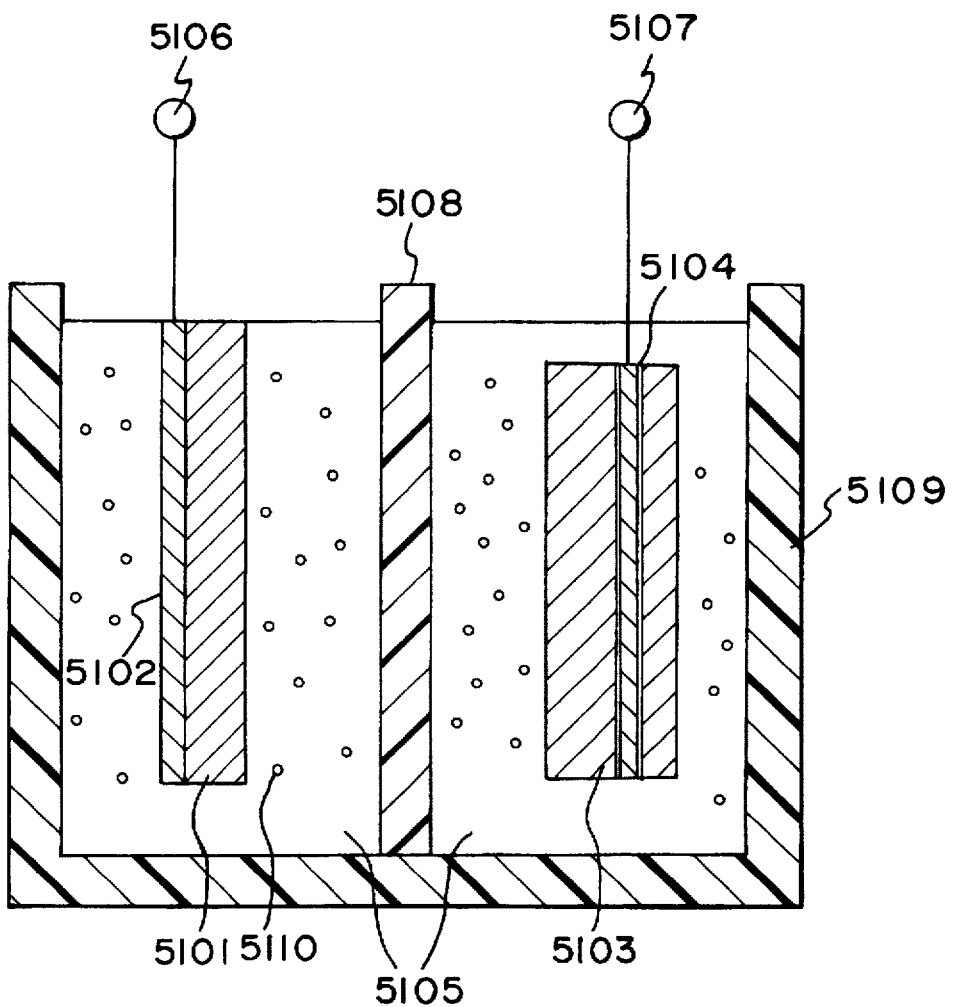
FIG. 5 is a typical view showing the basic construction of a microcapsule-containing secondary battery according to the present invention.

FIG. 5 shows the basic constitutional view of a secondary battery according to the present invention. In FIG. 5, 5101 is a negative electrode composed of negative electrode active material, 5102 is a negative collector, 5103 is a positive electrode composed of positive electrode active material, 5104 is a positive electrode collector, 5105 is an electrolytic solution (electrolyte), 5106 is a negative terminal, 5107 is a positive terminal, 5108 is a separator, 5109 is a battery case, and 5110 is a microcapsule containing the chemical substance.

(Battery reaction)

In a lithium battery in which the negative electrode active material of negative electrode 5101 is lithium or lithium alloy, with discharge reaction, lithium ions in electrolytic solution 5105 pass through the separator 5108 to enter the intercalation of positive electrode active material of positive electrode 5103, while dissolving into electrolyte 5105 from the negative electrode active material. On the other hand, with charge reaction, lithium ions in electrolytic solution 5105 pass through the separator 5108 to be deposited as lithium metal on the negative electrode active material (wherein dendrite is likely to grow), while lithium of the intercalation for the positive electrode active material 5103 of positive electrode dissolves into the electrolyte 5105.

(Heating of battery)

If there occurs any short-circuit, such as when dendrite grows to cause a short-circuit within the battery, the battery is broken to cause a short-circuit, or the external circuit connecting to the battery causes a short-circuit, the battery may be heated. In the battery of the present invention, the temperature elevation of the battery causes microcapsules to be dissolved or broken and opened to discharge the chemical substance. When discharged, the chemical substance is a substance reactable with lithium, lithium in the short-circuited portion is reacted therewith and removed so that the short-circuit is released, or insulating reaction products are formed on the lithium surface to increase the internal resistance of battery, so that the current is decreased and the excessive heating suppressed. When lithium in the short-circuit portion is reacted and removed to release the short-circuit, the lithium battery may be reusable. When the discharged chemical substance is a radical generating agent, there will occur polymerization reaction of the solvent in the electrolytic solution within the battery to increase the internal resistance of battery, if the temperature rises up to a decomposition temperature for the radical generating agent, resulting in the decrease in current to suppress the excessive heating.

Chemical Substance Reactable With Lithium

Examples of the chemical substance reactable with lithium for use with the present invention may include compounds having hydroxyl group and acids. In accordance with the material of microcapsule and the structure of battery, an appropriate combination of compound having hydroxyl group and acid is used. Examples of the compound having hydroxyl group may include water, alcohol, glycol, and glycerine.

Examples of alcohol may include methylalcohol, ethylalcohol, and higher alcohol such as cetyl alcohol. Examples of glycol may include from ethylene glycol or propylene glycol to 1,10-decane diol. Examples of acid may include inorganic acids such as hydrochloric acid, organic acids such as acetic acid, and fatty acids.

The above chemical substances will produce hydrogen upon reaction with lithium, wherein it is necessary to select the kind and concentration of the chemical substance which gradually reacts with lithium, so that the safety valve provided in the battery may be operated following the internal pressure of the battery even if it is increased due to produced hydrogen. Also, it is contemplated that hydrogen storage material for storing produced hydrogen may be contained within the battery, or the battery may have a structure capable of completely enclosing hydrogen even if the internal pressure is high.

Chemical Substance Bringing About Polymerization or Crosslinking Reaction

Examples of other chemical substance reacting with lithium usable with the present invention may include radical generating agents which generate radical with thermal decomposition. The radical generating agent can bring about polymerization reaction and crosslinking reaction. Examples of radical generating agent may include peroxide, azo compound and metallic compounds. Specific examples may include benzoyl peroxide and azobisisobutyronitrile.

Microcapsule

The wall film material of the microcapsule may be a material of which the microcapsule is broken or released and opened to discharge the chemical substance, when the battery reaches abnormal temperature. Specific examples thereof may include linear polyethylene,. oligomer such as olefins, poly-benzylidenethiodecamethylene sulfide, poly-1, 2-cyclohexylene sulfide, poly-cyclopropylenedimethyleneterephthalate, polydecamethylenephthalamide, polyethylene-2,2'-dibenzo-8, poly(oxydiethylene)-oxy-p-phenyleneoxide, calcium stearate, and carnauba wax. Examples of the above oligomer for olefine may include oligo(methylene), oligo(ethylene), oligo(cycloalkane), oligo(perfluoro-n-alkane), oligo(w-chloro-perfluoro-n-alkane), oligo(semifluororinated-n-alkane), which have repeating units of about 10 to 500.

The wall film material of the above microcapsule is necessary to be selected from materials insoluble in the electrolytic solution for the battery. In accordance with the highest temperature to maintain the safety of battery, the wall film material is also necessary to be selected based on the melting point of material.

The melting point of the wall film material for the microcapsule is preferably selected in the range from 70° to 150° C., and more preferably from 100° to 130° C.

As to the size and mixing amount of the microcapsule, in order to maintain the safety without decreasing the battery performance, the size of microcapsule is preferably from 1 to 500 microns., and more preferably from 5 to 50 microns. Also, the mixing amount of the microcapsule is preferably from 1 to 20 wt % relative to the electrolytic solution.

(Microcapsulation of chemical substance)

An exemplary method for the microcapsulation of chemical substance involves adding and dispersing the chemical substance directly or the chemical substance dissolved in the solvent in which the wall film material for the microcapsule is insoluble into a solution having the wall film material for microcapsule dissolved in the solvent, dripping this dispersed solution to the solvent such as water or alcohol with agitation, and conducting percolation or centrifugation and drying under lower pressure to prepare the chemical substance containing microcapsule. In addition to the previous chemical substance, monomer or flame retardant may be mixed into the microcapsule.

Flame Retardant

In addition to the chemical substance, flame retardant may be contained into the microcapsule. The use of flame retardant makes it possible to suppress any igniting of electrolytic solution when the battery is heated.

Examples of flame retardant may include phosphorus type flame retardants such as phosphorus compound, halogen type flame retardants such as iodine, bromine, chlorine, and halogen compound, and flame retardants containing phosphorus and halogen elements. Halogen type flame retardants are particularly effective because perfluorocarbon which is a fluorine compound inert liquid has no influence on the electrolytic reaction.

Examples of the above perfluorocarbon may include $C_5F_{12}$, $C_6F_{14}$, $C_7F_{16}$, $C_8F_{18}$, perfluorobutyltetrahydrofuran: $C_8F_{16}O$, perfluorotributylamine: $(C_4F_9)_3N$, perfluorotripropylamine: $(C_3F_7)_3N$, perfluorinatedether, perfluoromethyldecarine, and perfluorodecarine.

Examples of the above phosphorus type flame retardant may include red phosphorus, trimethyl phosphate, triethyl phosphate, tris(chloroethyl) phosphate, and tri (dichloropropyl) phosphate.

(Battery safety evaluation)

The safety evaluation tests for the battery are as follows.

Short-circuit Test

Confirmation test as to whether or not ignition occurs when the battery temperature rises by short-circuiting the positive electrode and the negative electrode via copper wire after charging at 25° C. and 85° C.

Nailing Test

Confirmation test as to whether or not ignition explosion occurs when the battery temperature rises by driving a nail having a diameter of 3 millimeters into the charged battery.

Burning Test

Confirmation test to ensure that no very rapid burning occurs by throwing a charged battery into carbide.

Water Immersion Test

Confirmation test to ensure that no bursting of explosion occurs by immersing in city water having a temperature of 25° C. for fourteen days.

High Temperature Storage Test

Confirmation test to ensure that the battery temperature is not more than 130° C. and there is no fuming, explosion and ignition by storing a battery at 100° C. for five hours.

Overcharge

Confirmation test to ensure that no ignition occurs even if the battery temperature rises by charging for a rate of 10 hours with a terminal voltage of 5.0 volts, and for 24 hours with the cut-off.

The present invention will be described in detail based on the examples. It should be noted that the present invention is not limited to such examples.

(EXAMPLE 1)

A lithium secondary battery of a schematic cross-sectional structure as shown in FIG. 3 was fabricated.

As the positive electrode active material, lithium manganese oxide was prepared by mixing electrolyzed manganese dioxide and lithium carbonate at a ratio of 1 to 0.4, and then heating at 800° C. After mixing graphite and powder fluororesin paint Superconac (made by Nippon Oil & Fats) to prepared lithium manganese oxide, the mixture was molded under pressure to nickel mesh 304, and subjected to thermal treatment at 170° C. to form a positive electrode 303.

A titanium mesh collector with lead 302 was connected under pressure from the back side to a lithium metal foil in the dry argon gas atmosphere, and covered with a fluororesin paint Lumifron thin film (made by Asahi Glass) to prepare a lithium negative electrode 301. The electrolytic solution was prepared by dissolving borate tetrafluoride lithium salt into an equivalent mixture solvent of propylene carbonate (PC) and dimethoxyethane (DME) and mixing a fluorine type inert liquid by 10 wt % thereto.

Separator 308 was composed of an alumina film, a polypropylene non-woven fabric, and a microporous separator of polypropylene which were bonded together.

The assembling was performed in such a way as to sandwich a separator 308 between negative electrode 301 and positive electrode 303, then rolling and inserting the entirety into a positive electrode can 307 made of stainless material of clad titanium, connecting a collector lead, injecting electrolytic solution, and enclosing the whole structure by a negative electrode cap 306 with a safety valve made of stainless material of clad titanium and an insulation packing 310 made of fluorine rubber to fabricate a spiral cylindrical lithium secondary battery.

(COMPARATIVE EXAMPLE 1)

A lithium secondary battery was fabricated in the same say as in Example 1, with the exception that aluminum hydroxide as flame retardant was mixed by 10 wt % to electrolytic solution, instead of fluorine type inert liquid in Example 1.

(EXAMPLE 2)

A spiral cylindrical lithium secondary battery of FIG. 3 was fabricated in the same way as in Example 1.

The positive electrode active material was formed by mixing manganese dioxide and lithium carbonate at a ratio of 1 to 0.4, and heating at 800° C. to prepare lithium manganese oxide. After mixing graphite and tetrafluoroethylene powder to prepared lithium manganese oxide, the mixture was molded under pressure to nickel mesh 304 to form a positive electrode 303.

A nickel mesh collector with lead 300 was connected under pressure from the back side to a lithium metal foil in the dry argon gas atmosphere, and covered with a polyphosphazene PPZ-U1001 thin film (made by Idemitsu PetroChemical) to prepare a lithium negative electrode 301. The electrolytic solution was prepared by dissolving borate tetrafluoride lithium salt by 1M (mol/l) into an equivalent mixture solvent of propylene carbonate (PC) and dimethoxyethane (DME) and mixing tricresyl phosphate by 5 wt %.

Separator 308 was composed of polypropylene nonwoven fabric and a microporous separator of polypropylene which were bonded together.

The assembling was performed in such a way as to sandwich a separator 308 between negative electrode 301 and positive electrode 303, then rolling and inserting the entirety into a positive electrode can 307 made of stainless material for clad titanium, connecting a collector lead, injecting electrolytic solution, and enclosing the whole structure by a negative electrode cap 306 with a safety cap made of stainless material of clad titanium and an insulation packing 310 made of fluorine rubber to fabricate a lithium secondary battery.

(COMPARATIVE EXAMPLE 2)

A lithium secondary battery was fabricated in the same way as in Example 2, with the exception that lithium negative electrode was not covered with polyphosphazene and magnesium hydroxide as flame retardant was mixed by 5 wt % to electrolytic solution, instead of tricresyl phosphate in Example 2.

(EXAMPLE 3)

A spiral cylindrical lithium secondary battery of FIG. 3 was fabricated in the same way as in Example 1.

The positive electrode active material was formed by mixing electrolyzed manganese dioxide and lithium carbonate at a ratio of 1 to 0.4, and heating at 800° C. to prepare lithium manganese oxide. After mixing acetylene black and tetrafluoroethylene powder to prepared lithium manganese oxide, the mixture was molded under pressure at 250° C. to nickel mesh 304 to form a positive electrode 303.

A nickel mesh collector with lead 300 was connected under pressure from the back side to a lithium metal foil in the dry argon gas atmosphere, and covered with a polyphosphazene PPZ-U1001 thin film (made by Idemitsu Petrochemical) to prepare a lithium negative electrode 301. The electrolytic solution was prepared by dissolving borate tetrafluoride lithium salt by 1M (mol/l) into an equivalent mixture solvent of propylene carbonate (PC) and dimethoxyethane (DME) and mixing, hexabromobenzene by 2 wt %.

Separator 308 was composed of a titanium oxide film, a polypropylene non-woven fabric and a microporous separator of polypropylene Which were bonded together.

The assembling was performed in such a way as to sandwich a separator 308 between negative electrode 301 and positive electrode 303, then rolling and inserting the entirety into a positive electrode can 307 made of stainless material of clad titanium, connecting a collector lead, injecting electrolytic solution, and enclosing the whole structure by a negative electrode cap 306 with a safety cap made of stainless material of titanium clad and an insulation packing 310 made of fluorine rubber to fabricate a lithium secondary battery.

(Evaluation of flame resistance)

A portion consisting of the negative electrode, the separator holding flame retardant and electrolytic solution, and the positive electrode bonded together in the lithium secondary battery in the Examples 1, 2 and 3 was taken out, and cut out 12 inches in length to have test sample pieces. A Fisher Body Match Test as set forth below was conducted and confirmed that test sample of Examples 1, 2, 3 was self-extinguishing (note that in the Fisher Body Match Test, a flame of match was subjected for 15±5 seconds to a test sample 12 inches long which was stood vertically, and judged to be self-extinguishing when not burning more than 6 inches and flammable when burning 6 inches or greater).

To further enhance the effect of flame retardant, a test sample piece for flame resistance evaluation, which was equivalent except that no flame retardant was added in the Examples 1, 2 and 3, was prepared for the comparison test, and the Fisher Body Match Test was conducted. The result was such that since the separator made of polypropylene holding electrolytic solution was burnt, the test piece was judged flammable. Also, in the examples 1, 2 and 3, a test sample piece for the comparison was fabricated in the same way, except that no flame retardant was added and the surface of negative electrode was not covered. This test Sample piece was subjected to the Fisher Body Match Test and judged flammable because lithium negative electrode was also burnt, besides the polypropylene separator holding electrolytic solution.

From the above evaluation of flame resistance, it could be found that the safety against burning was improved with the present invention.

(Safety evaluation for lithium secondary battery)

For each of the lithium secondary batteries fabricated in the Examples 1, 2 and 3, charge and discharge was repeated by 20 cycles, and after charging, the safety was evaluated in accordance with the following test method. Excellent test results could be obtained for any of the lithium secondary batteries.

Short-circuit Test

It was confirmed that no firing occurred when the battery temperature rose by short-circuiting the positive electrode and the negative electrode via a copper wire after charging at 25° C. and 85° C.

Nailing Test

It was confirmed that no firing or explosion occurred when the battery temperature rose by driving a nail having a diameter of 3 millimeters into the charged battery.

Burning Test

It was confirmed that no very rapid burning occurred by throwing a charged battery into carbide.

Water Immersion Test

It was confirmed that no burning or explosion occurred by immersing in city water at a temperature of 25° C. for fourteen days.

Overcharge

It was confirmed that no burning occurred even if the battery temperature rose by charging for a rate of 10 hours at a terminal voltage of 5.0 volts, and for 24 hours at the cut-off.

From the results of safety evaluation test as above described, it has been found that the lithium secondary battery of the present invention has high safety even after the repetition of charge and discharge, despite the use of metal lithium for the negative electrode active material.

Also, the same test was conducted for the Comparative Examples 1, 2, so that substantially the equivalent results were obtained, but a significant difference was seen in the battery performance.

(Performance test for battery)

The self-discharge rate calculated from the discharge capacity at the first cycle and the discharge capacity one month after charging was obtained for the Examples 1, 2 and the Comparative Examples 1, 2, and the performance of the examples was compared when the performance of the comparative example was designated as 1.

The results are listed in Table 1. From the relative comparison between Example 1 and Comparative Example 1 and between Example 2 and Comparative Example 2, it can be found that the battery performance degrades when aluminum hydroxide and magnesium hydroxide are used as the flame retardant.

TABLE 1

|  | Discharge capacity | Self-discharge rate |
|---|---|---|
| Example 1/ Comparative example 1 | 1.4 | 0.1 |
| Example 2/ Comparative example 2 | 1.2 | 0.3 |

(EXAMPLE 4)

First, using linear polyethylene for the wall film material for the capsule and 1, 4-butanediol for the chemical substance, a microcapsule was prepared in the following way. Colloidal ethyl alcohol solution for the microcapsule was prepared by dripping a solution prepared by dripping 1, 4-butanediol into xylene solution of linear polyethylene, into ethylene alcohol. Obtained colloidal solution was separated and percolated, and dried under lower pressure to prepare the microcapsule.

Next, a lithium secondary battery of a structure having a schematic cross-section as shown in FIG. 3 was fabricated.

The positive electrode active material was formed by mixing electrolyzed manganese dioxide and lithium carbonate at a ratio of 1 to 0.4, and heating at 800° C. to prepare lithium manganese oxide. After mixing graphite and powder fluororesin paint Superconac (made by Nippon Oil & Fats) to lithium manganese oxide, the mixture was molded under pressure to a nickel mesh 304, and subjected to thermal treatment at 170° C. to form a positive electrode 303.

A titanium mesh collector with lead 302 was connected under pressure from the back side to a lithium metal foil in the dry argon gas atmosphere, and covered with a fluororesin paint Lumifron thin film (made by Asahi Glass) to prepare a lithium negative electrode 301. The electrolytic solution was prepared by dissolving borate tetrafluoride lithium salt by 1M (mol/l) into an equivalent mixture solvent of propylene carbonate (PC) and dimethoxyethane (DME) and mixing microcapsules prepared by the above method by 10 wt % thereto to prepare a microcapsule dispersion liquid.

Separator 308 was composed of an alumina film, a polypropylene non-woven fabric, and a microporous separator of polypropylene which were bonded together.

The assembling was performed in such a way as to sandwich a separator 308 between negative electrode 301 and positive electrode 303, then rolling and inserting the entirety into a positive electrode can 307 made of stainless material of clad titanium, connecting a collector lead, injecting electrolytic solution with microcapsules dispersed, and enclosing the whole structure by a negative electrode cap 306 with safety cap made of stainless material of titanium clad and an insulation packing 310 made of fluorine rubber to fabricate a spiral cylindrical lithium secondary battery.

(EXAMPLE 5)

First, using oligo(semifluorinated-n-alkane): F—[CF$_2$]$_m$—[CH$_2$]$_n$—H (m=12, n=20) for the wall film material of the capsule and azobisisobutyronitrile for the chemical substance, a microcapsule was prepared in the following way. Colloidal ethyl alcohol solution for the microcapsule was prepared by dripping a solution prepared by dripping azobisisobutyronitrile into dimethylsulfoxide solution for oligo(semifluorinated-n-alkane), into ethyl alcohol. Obtained colloidal solution was separated and percolated, and dried under lower pressure to prepare the microcapsule.

A spiral cylindrical type lithium secondary battery of FIG. 3 was fabricated in the same way as in example 4.

The positive electrode active material was formed by mixing electrolyzed manganese dioxide and lithium carbonate at a ratio of 1 to 0.4, and heating at 800° C. to prepare lithium manganese oxide. After mixing graphite and tetrafluoroethylene powder to lithium manganese oxide, the mixture was molded under pressure at 250° C. to a nickel mesh 304 to form a positive electrode 303.

A titanium mesh collector with lead 300 was connected under pressure from the back side to a lithium metal foil in the dry argon gas, atmosphere, and covered with a polyphosphazene PPZ-R1001 thin film (Idemitsu Petrochemical) to prepare a lithium negative electrode 301. The electrolytic solution was prepared by dissolving borate tetrafluoride lithium salt by 1M (mol/l) into an equivalent mixture solvent of propylene carbonate (PC) and dimethoxyethane (DME) and mixing microcapsules prepared by the above method by 3 wt % thereto to prepare a microcapsule dispersion liquid.

Separator 308 was composed of a polypropylene non-woven fabric and a microporous separator of polypropylene which were bonded together.

The assembling was performed in such a way as to sandwich a separator 308 between negative electrode 301 and positive electrode 303, then rolling and inserting the entirety into a positive electrode can 307 made of stainless material of clad titanium, connecting a collector lead, injecting electrolytic solution with microcapsules dispersed, and enclosing the whole structure by a negative electrode cap 306 with safety cap made of stainless material of titanium clad and an insulation packing 310 made of fluorine rubber to fabricate a lithium secondary battery.

(EXAMPLE 6)

Using oligo(ethylene): H[CF$_2$]$_n$H (m=288) for the wall film material of capsule and cyclohexanol for the chemical substance, a microcapsule was prepared in the following way. Colloidal ethyl alcohol solution for microcapsule was prepared by dripping a solution prepared by adding cyclohexanol and red phosphorus into xylene solution for oligo (ethylene), into ethyl alcohol. Obtained colloidal solution was separated and percolated, and dried under lower pressure to prepare the microcapsule.

A spiral cylindrical type lithium secondary battery of FIG. 3 was fabricated in the same way as in example 4.

The positive electrode active material was formed by mixing electrolyzed manganese dioxide and lithium carbonate at a ratio of 1 to 0.4, and heating at 800° C. to prepare lithium manganese oxide. After mixing acetylene black and tetrafluoroethylene powder to lithium manganese oxide, the mixture was molded under pressure at 250° C. to a nickel mesh 304 to form a positive electrode 303.

A titanium mesh collector with lead 302 was connected under pressure from the back side to a lithium metal foil in the dry argon gas atmosphere to prepare a lithium negative electrode 301. The electrolytic solution was prepared by dissolving borate tetrafluoride lithium salt by 1M (mol/l) into an equivalent mixture solvent of propylene carbonate (PC) and dimethoxyethane (DME) and mixing microcapsules prepared by the above method by 5 wt % thereto to prepare a microcapsule dispersion liquid.

Separator 308 was composed of a titanium oxide film, a polypropylene non-woven fabric and a microporous separator of polypropylene which were bonded together.

The assembling was performed in such a way as to sandwich a separator 308 between negative electrode 301 and positive electrode 303, then rolling and inserting the entirety into a positive electrode can 307 made of stainless material for clad titanium, connecting a collector lead, injecting electrolytic solution with microcapsules dispersed, and enclosing the whole structure by a negative electrode cap 306 with a safety cap made of stainless material of titanium clad and an insulation packing 310 made of fluorine rubber to fabricate a lithium secondary battery.

(COMPARATIVE EXAMPLE 3)

A lithium secondary battery was fabricated in the same way as in example 6, with the exception that no microcapsule was dispersed and a lithium foil undergoing no surface treatment was used for the negative electrode.

(EXAMPLE 7)

Using oligo(semifluorinated-n-alkane): F—[CF$_2$]$_m$—[CH$_2$]$_n$—H (m=12, n=20) for the wall film material of capsule and benzoyl peroxide for the chemical substance, a microcapsule was prepared in the following way. Colloidal ethyl alcohol solution for microcapsule was prepared by dripping a solution prepared by adding benzoyl peroxide into dimethylsulfoxide solution for oligo(semifluorinated-n- alkane), into ethyl alcohol. Obtained colloidal solution was separated and percolated, and dried under lower pressure to prepare the microcapsule.

A spiral cylindrical type lithium secondary battery of FIG. 3 was fabricated in the same way as in example 4.

The positive electrode active material was formed by mixing electrolyzed manganese dioxide and lithium carbonate at a ratio of 1 to 0.4, and heating at 800° C. to prepare lithium manganese oxide. After mixing acetylene black and tetrafluoroethylene powder to lithium manganese oxide prepared, the mixture was molded under pressure at 250° C. to a nickel mesh 304 to form a positive electrode 303.

A titanium mesh collector with lead 302 was connected under pressure from the back side to a lithium metal foil in the dry argon gas atmosphere and covered with a polyphosphazene PPZ-R1001 thin film (Idemitsu Petrochemical) to prepare a lithium negative electrode 301. The electrolytic solution was prepared by dissolving borate tetrafluoride lithium salt by 1M (mol/l) and mixing microcapsules prepared by the above method by 5 wt % thereto to prepare a microcapsule dispersion liquid.

Overcharge

It was confirmed that no burning occurred even if the battery temperature rose by charging for a rate of 10 hours at a terminal voltage of 5.0 volts and for 24 hours at the cut-off.

However, in the Comparative Example 1, an abnormal temperature elevation as large as 10° to 30° C. was seen in the short-circuit test, as compared with the battery fabricated in the example. Also, in the overcharge test, there were observed some of ten batteries fabricated by the same method which were fuming.

From the results of safety evaluation test, it has been found that the lithium secondary battery of the present invention has high safety even after the repetition of charge and discharge, despite the use of metal lithium for the negative electrode active material.

With the present invention, it is possible to supply the battery involving no risk of burning and having high safety. Also, it is possible to supply the secondary battery in which the repetition of charge and discharge is allowed at the high energy density with metal lithium used for the negative electrode active material and with the safety retained.

Separator 308 was composed of a glass nonwoven fabric, a polypropylene non-woven fabric and a microporous separator of polypropylene which were bonded together.

The assembling was performed in such a way as to sandwich a separator 308 between negative electrode 301 and positive electrode 303, then rolling and inserting the entirety into a positive electrode can 307 made of stainless material of clad titanium, connecting a collector lead, injecting electrolytic solution with microcapsules dispersed, and enclosing the whole structure by a negative electrode cap 306 with a safety cap made of stainless material of titanium clad and an insulation packing 310 made of fluorine rubber to fabricate a lithium secondary battery.
(Safety evaluation of lithium secondary battery)

For each of the lithium secondary batteries fabricated in the Examples 4, 5, 6 and 7 and Comparative Example 3, charge and discharge was repeated for 20 cycles, and after charging, the safety was evaluated in accordance with the following test method. Excellent test results were obtained in the above test for any of the lithium secondary batteries in the examples.

Short-circuit Test

It was confirmed that no burning occurred when the battery temperature rose by short-circuiting the positive electrode and the negative electrode via a copper wire after charging at 25° C. and 85° C.

Nailing Test

It was confirmed that no burning or explosion occurred when the battery temperature rose by driving a nail having a diameter of 3 millimeters into the charged battery.

Burning Test

It was confirmed that no furious burning occurred-by throwing a charged battery into carbide.

Water Immersion Test

It was confirmed that no burning or explosion occurred by immersing in city water at a temperature of 25° C. for fourteen days.

High Temperature Storage Test

It was confirmed that the battery temperature was not more than 130° C. and there was no fuming, explosion and burning by storing a battery at 100° C. for five hours.

What is claimed is:

1. A lithium secondary battery comprising a negative electrode having negative electrode active material, a positive electrode having positive electrode active material, a separator sandwiched between said negative electrode and said positive electrode, and an electrolyte solution between said negative electrode and said positive electrode, wherein said electrolyte solution includes a perfluorocarbon inert liquid as a flame retardant.

2. A lithium secondary battery according to claim 1, characterized in that the surface of said negative electrode opposed to the positive electrode is covered with a membrane capable of transmitting at least lithium ions.

3. A lithium secondary battery according to claim 1, characterized in that the surface of said positive electrode opposed to the negative electrode is covered with a membrane capable of transmitting at least lithium ions.

4. A lithium secondary battery according to claim 2, characterized in that said membrane is made of flame retardant or incombustible material.

5. A lithium secondary battery according to claim 1, wherein said negative electrode active material is lithium or lithium alloy.

6. A lithium secondary battery according to claim 1, characterized in that the mixture ratio by weight of perfluorocarbon in electrolyte solution is from 1 to 20 wt %.

7. A lithium secondary battery according to claim 1, characterized in that the boiling point of said perfluorocarbon is 50° C. or above.

8. A secondary battery according to claim 3, wherein said membrane comprises a flame retarding material or an incombustible material.

9. A lithium secondary battery comprising a negative electrode having negative electrode active material, a positive electrode having positive electrode active material, a separator sandwiched between said negative electrode and said positive electrode, and an electrolyte solution between said negative electrode and said positive electrode, wherein said electrolyte solution includes tricresyl phosphate as a flame retardant.

10. A lithium secondary battery according to claim 9, characterized in that the surface of said negative electrode opposed to the positive electrode is covered with a membrane capable of transmitting at least lithium ions.

11. A lithium secondary battery according to claim 9, characterized in that the surface of said positive electrode opposed to the negative electrode is covered with a membrane capable of transmitting at least lithium ions.

12. A lithium secondary battery according to claim 10, characterized in that said membrane comprises a flame retardant or an incombustible material.

13. A lithium secondary battery according to claim 11, characterized in that said membrane comprises a flame retardant or an incombustible material.

14. A lithium secondary battery according to claim 9, wherein said negative electrode active material is lithium or lithium alloy.

15. A lithium secondary battery according to claim 9 characterized in that the mixture ratio by weight of the tricresyl phosphate in said electrolyte solution is from 1 to 20 wt %.

16. A secondary battery containing microcapsules comprising:
a negative electrode having negative electrode active material, a positive electrode having positive electrode active material with a separator sandwiched between said negative electrode and said positive electrode, and an electrolyte solution between said negative electrode and said positive electrode, characterized by comprising microcapsules containing a chemical substance having at least a compound having hydroxyl group in at least one of said separator and said electrolyte solution.

17. A secondary battery according to claim 16, wherein said chemical substance is alcohol.

18. A secondary battery according to claim 16, characterized in that the mixture amount of said microcapsules is from 1 to 20 wt % of said electrolyte solution.

19. A secondary battery according to claim 16, characterized in that said secondary battery is a lithium secondary battery.

20. A secondary battery according to claim 16, characterized in that said chemical substance has at least flame retardant.

21. A secondary battery according to claim 16, characterized in that the surface of the negative electrode opposed to the positive electrode is covered with a membrane capable of transmitting at least lithium ions.

22. A secondary battery according to claim 16, characterized in that the surface of the positive electrode opposed to the negative electrode is covered with a membrane capable of transmitting at least lithium ions.

23. A secondary battery according to claim 21 characterized in that said membrane is made of fire retarding material or incombustible material.

24. A secondary battery according to claim 16, wherein said negative electrode active material is lithium or lithium alloy.

25. A secondary battery according to claim 16, characterized in that the melting point of said microcapsules is from 70° to 150° C.

26. A secondary battery according to claim 16, characterized in that each said microcapsule is from 1 to 500 microns in size.

27. A secondary battery according to claim 16, characterized in that the amount of said microcapsules is from 1 to 20 wt % of said electrolyte solution.

28. A secondary battery according to claim 22, wherein said membrane comprises a flame retarding material or an incombustible material.

29. A secondary battery according to claim 16, wherein said chemical substance is alcohol.

30. A secondary battery according to claim 16, characterized in that the amount of said microcapsules is from 1 to 20 wt % of said electrolyte solution.

31. A secondary battery containing microcapsules comprising:
a negative electrode having negative electrode active material, a positive electrode having positive electrode active material with a separator sandwiched between said negative electrode and said positive electrode, and an electrolyte solution between said negative electrode and said positive electrode, characterized by comprising microcapsules containing a chemical substance having at least polymerization initiator or cross-linking agent in at least one of said separator and said electrolyte solution.

32. A secondary battery according to claim 31, characterized in that said secondary battery is a lithium secondary battery.

33. A secondary battery according to claim 31, characterized in that said microcapsules contain, ink addition to polymerization initiator or cross-linking agent, one kind or more selected from monomer, oligomer, and polymer.

34. A secondary battery according to claim 31, characterized in that said chemical substance has at least flame retardant.

35. A secondary battery according to claim 31, characterized in that the surface of the negative electrode opposed to the positive electrode is covered with a membrane capable of transmitting at least lithium ions.

36. A secondary battery according to claim 31, characterized in that the surface of the positive electrode opposed to the negative electrode is covered with a membrane capable of transmitting at least lithium ions.

37. A secondary battery according to claim 35 characterized in that said membrane is made of fire retarding material or incombustible material.

38. A secondary battery according to claim 31, wherein said negative electrode active material is lithium or lithium alloy.

39. A secondary battery according to claim 31, characterized in that the melting point of said microcapsules is from 70° to 150° C.

40. A secondary battery according to claim 31, characterized in that each said microcapsule is from 1 to 500 microns in size.

41. A secondary battery according to claim 31, characterized in that the amount of said microcapsules is from 1 to 20 wt % of said electrolyte solution.

42. A secondary battery according to claim 36, wherein said membrane comprises a flame retarding material or an incombustible material.

43. A secondary battery according to claim 31, characterized in that the amount of said microcapsules is from 1 to 20 wt % of said electrolyte solution.

44. A secondary battery containing microcapsules comprising:
a negative electrode having negative electrode active material, a positive electrode having positive electrode active material with a separator sandwiched between said negative electrode and said positive electrode, and an electrolyte solution between said negative electrode and said positive electrode, characterized by comprising microcapsules containing a chemical substance having at least acid in at least one of said separator and said electrolyte solution.

45. A secondary battery according to claim 44, characterized in that said secondary battery is a lithium secondary battery.

46. A secondary battery according to claim 44, characterized in that said chemical substance has at least flame retardant.

47. A secondary battery according to claim 44, characterized in that the surface of the negative electrode opposed to the positive electrode is covered with a membrane capable of transmitting at least lithium ions.

48. A secondary battery according to claim 44, characterized in that the surface of the positive electrode opposed to the negative electrode is covered with a membrane capable of transmitting at least lithium ions.

49. A secondary battery according to claim 47, characterized in that said membrane is made of fire retarding material or incombustible material.

50. A secondary battery according to claim 44, wherein said negative electrode active material is lithium or lithium alloy.

51. A secondary battery according to claim 44, characterized in that the melting point of said microcapsules is from 70° to 150° C.

52. A secondary battery according to claim 44, characterized in that each said microcapsule is from 1 to 500 microns in size.

53. A secondary battery according to claim 44, characterized in that the amount of said microcapsules is from 1 to 20 wt % of said electrolyte solution.

54. A secondary battery according to claim 48, wherein said membrane comprises a flame retarding material or an incombustible material.

55. A secondary battery according to claim 44, characterized in that the amount of said microcapsules is from 1 to 20 wt % of said electrolyte solution.

56. A secondary battery containing microcapsules comprising:
 a negative electrode having negative electrode active material, a positive electrode having positive electrode active material with a separator sandwiched between said negative electrode and said positive electrode, and an electrolyte solution between said negative electrode and said positive electrode, characterized by comprising microcapsules containing a chemical substance in at least one of said separator and said electrolyte solution and a surface of the positive electrode opposed to the negative electrode is covered with a membrane capable of transmitting at least lithium ions.

57. A secondary battery according to claim 56, wherein said chemical substance has at least a compound having hydroxyl group.

58. A secondary battery according to claim 56, characterized in that said chemical substance has at least polymerization initiator or cross-linking agent.

59. A secondary battery according to claim 58, characterized in that said microcapsules contain, in addition to polymerization initiator or cross-linking agent, one kind of more selected from monomer, oligomer, and polymer.

60. A secondary battery according to claim 56, characterized in that said chemical substance has at least acid.

61. A secondary battery according to claim 56, characterized in that said chemical substance has at least flame retardant.

62. A secondary battery according to claim 56, characterized in that the surface of the negative electrode opposed to the positive electrode is covered with a membrane capable of transmitting at least lithium ions.

63. A second battery according to claim 56, characterized in that the surface of the positive electrode opposed to the negative electrode is covered with a membrane capable of transmitting at least lithium ions.

64. A secondary battery according to claim 62 characterized in that said membrane is made of fire retarding material or incombustible material.

65. A secondary battery according to claim 62, wherein said negative electrode active material is lithium or lithium alloy.

66. A secondary battery according to claim 62, characterized in that the melting point of said microcapsules is from 70° to 150° C.

67. A secondary battery according to claim 62, characterized in that each said microcapsule is from 1 to 500 microns in size.

68. A secondary battery according to claim 62, characterized in that the amount of said microcapsules is from 1 to 20 wt % of said electrolyte solution.

69. A secondary battery according to claim 63, wherein said membrane comprises a flame retarding material or an incombustible material.

70. A secondary battery according to claim 56, wherein said chemical substance is alcohol.

71. A secondary battery according to claim 56, characterized in that the amount of said microcapsules is from 1 to 20 wt % of said electrolyte solution.

* * * * *

UNITED STATES PATENT AND TRADEMARK OFFICE
CERTIFICATE OF CORRECTION

PATENT NO. : 5,714,277

DATED : February 3, 1998

INVENTOR(S): SOICHIRO KAWAKAMI

Page 1 of 5

It is certified that error appears in the above-identified patent and that said Letters Patent is hereby corrected as shown below:

[57] ABSTRACT

Line 4, "microcapsules containing lithium" should read --containing microcapsules--.
Line 11, "within" should read --within the--.

COLUMN 1

Line 20, "exhaust." should read --emit--.
Line 22, "as" should read --as a--.
Line 44, "an" should read --of an--.
Line 45, "some" should read --an--.

COLUMN 2

Line 27, "researches" should read --research--.
Line 64, "acid," should read --an acid,--.
Line 65, "flame " should read --a flame--.

COLUMN 3

Line 9, "batter" should read --battery--.
Line 56, "Causing" should read --Causes--.

COLUMN 5

Line 20, "in" should read --in a--.
Line 35, "of" should read --of the--.(first occurrence)
Line 38, "Positive" should read --The positive--.

UNITED STATES PATENT AND TRADEMARK OFFICE
CERTIFICATE OF CORRECTION

PATENT NO. : 5,714,277

DATED : February 3, 1998

INVENTOR(S): SOICHIRO KAWAKAMI

It is certified that error appears in the above-identified patent and that said Letters Patent is hereby corrected as shown below:

COLUMN 6

Line 17, "or" should be deleted.
Line 42, "pounded" should read --pound--.
Line 44, "any" should read --a--.

COLUMN 7

Line 28, "of" should read --of the--.
Line 36, "of" should read --of the--.
Line 44, "where" should read --where the--.

COLUMN 8

Line 36, "resins," should read --resins--.
Line 43, "his" should read --this--.
Line 56, "of" should read --of the--.

COLUMN 9

Line 21, "of" should read --of the--.
Line 56, "substance" should read --substances--.

Line 61, "agent" should read --agents--.

UNITED STATES PATENT AND TRADEMARK OFFICE
CERTIFICATE OF CORRECTION

PATENT NO. : 5,714,277

DATED : February 3, 1998

INVENTOR(S) : SOICHIRO KAWAKAMI

It is certified that error appears in the above-identified patent and that said Letters Patent is hereby corrected as shown below:

COLUMN 10

Line 3, "polyethylene,." should read --polyethylene,--.
   Line 17, "of" should read --of the--.
   Line 26, "microns.," should read --microns,--.

COLUMN 11

Line 14, "no" should be deleted.
   Line 15, "occurs" should read --does not occur--.
   Line 19, "of" should read --or--.

COLUMN 13

Line 9, "mixing," should read --mixing--.
   Line 13, "Which" should read --which--.
   Line 21, "titanium clad" should read --clad titanium--.
   Line 48, "Sample" should read --sample--.

COLUMN 14

Line 8, "no very rapid burning occurred" should
     read --very rapid burning did not occur--.

COLUMN 15

Line 41, "Obtained" should read --The obtained--.

UNITED STATES PATENT AND TRADEMARK OFFICE
CERTIFICATE OF CORRECTION

PATENT NO. : 5,714,277

DATED : February 3, 1998

INVENTOR(S) : SOICHIRO KAWAKAMI

It is certified that error appears in the above-identified patent and that said Letters Patent is hereby corrected as shown below:

COLUMN 18

Line 14, "no furious burning occurred-by" should read
       --very rapid burning did not occur by--.

COLUMN 19

Line 40, "flame" should read --a flame--.

COLUMN 20

Line 15, "least" should read --least a--.
    Line 22, "ink" should read --in--.
    Line 26, "flame" should read --a flame--.
    Line 36, "claim 35" should read --claim 35,--.

COLUMN 21

Line 5, "flame" should read --a flame--.

UNITED STATES PATENT AND TRADEMARK OFFICE
CERTIFICATE OF CORRECTION

PATENT NO. : 5,714,277

DATED : February 3, 1998

INVENTOR(S): SOICHIRO KAWAKAMI

It is certified that error appears in the above-identified patent and that said Letters Patent is hereby corrected as shown below:

<u>COLUMN 22</u>

```
Line 10, "of" should read --or--.
Line 14, "flame" should read --a flame--.
```

Signed and Sealed this

Twentieth Day of October, 1998

*Attest:*

*Attesting Officer*

BRUCE LEHMAN

*Commissioner of Patents and Trademarks*

UNITED STATES PATENT AND TRADEMARK OFFICE
CERTIFICATE OF CORRECTION

PATENT NO. : 5,714,277

DATED : February 3, 1998

INVENTOR(S) : SOICHIRO KAWAKAMI

It is certified that error appears in the above-identified patent and that said Letters Patent is hereby corrected as shown below:

COLUMN 6

Line 52, "as" should read --as a--.

COLUMN 9

Line 58, "radical" should read --radicals--.

Signed and Sealed this

Eleventh Day of May, 1999

Attest:

Q. TODD DICKINSON

*Attesting Officer*    Acting Commissioner of Patents and Trademarks